United States Patent
Cooper et al.

(10) Patent No.: US 9,015,578 B2
(45) Date of Patent: Apr. 21, 2015

(54) DYNAMIC OPTIMIZATION OF AVAILABLE DISPLAY SPACE

(75) Inventors: Michael S. Cooper, Seattle, WA (US); Filipe Fortes, Seattle, WA (US); Kevin B. Gjerstad, Kirkland, WA (US); Radoslav P. Nickolov, Bellevue, WA (US); David H. Salesin, Seattle, WA (US); Raman Narayanan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1335 days.

(21) Appl. No.: 11/338,385

(22) Filed: Jan. 24, 2006

(65) Prior Publication Data

US 2007/0174291 A1    Jul. 26, 2007

(51) Int. Cl.
*G06F 17/00* (2006.01)
*G06F 17/30* (2006.01)

(52) U.S. Cl.
CPC ................ *G06F 17/30905* (2013.01)

(58) Field of Classification Search
CPC ............................................ G06F 17/30905
USPC ............................................. 707/10; 715/243
See application file for complete search history.

(56) References Cited

U.S. PATENT DOCUMENTS

| | | | |
|---|---|---|---|
| 5,414,809 A * | 5/1995 | Hogan et al. | 715/765 |
| 6,023,714 A | 2/2000 | Hill et al. | 707/513 |
| 6,345,279 B1 * | 2/2002 | Li et al. | 707/104.1 |
| 6,466,971 B1 * | 10/2002 | Humpleman et al. | 709/220 |
| 6,928,610 B2 | 8/2005 | Brintzenhofe et al. | 715/517 |
| 2003/0023698 A1 * | 1/2003 | Dieberger et al. | 709/207 |
| 2003/0195923 A1 * | 10/2003 | Bloch et al. | 709/203 |
| 2004/0230608 A1 * | 11/2004 | Ornstein et al. | 707/104.1 |
| 2004/0263530 A1 * | 12/2004 | Sahuc et al. | 345/619 |
| 2005/0055635 A1 | 3/2005 | Bargeron et al. | 715/525 |
| 2005/0091173 A1 * | 4/2005 | Alve | 705/71 |
| 2005/0172224 A1 * | 8/2005 | Kobashi et al. | 715/517 |
| 2006/0077941 A1 * | 4/2006 | Alagappan et al. | 370/338 |
| 2006/0146071 A1 * | 7/2006 | Morita et al. | 345/619 |
| 2006/0236250 A1 * | 10/2006 | Gargi | 715/753 |
| 2007/0079010 A1 * | 4/2007 | Heredia et al. | 709/246 |
| 2007/0132779 A1 * | 6/2007 | Gilbert et al. | 345/619 |

* cited by examiner

*Primary Examiner* — Jensen Hu
(74) *Attorney, Agent, or Firm* — Bryan Webster; Leonard Smith; Micky Minhas

(57) ABSTRACT

Embodiments provide for systems, methods, and computer program products for optimizing content rendered at a display unit by dynamically formatting the content layout based on a display unit's parameters. For example, content is received from a server. The content is capable of being rendered at a number of remote display devices with various display parameters. In addition, a number of display rules are also received. The display rules specify how content should be rendered in terms of content layout and properties by the remote display devices based on the parameters of the display devices. The display rules are compared with the parameters of a display device that is used to render the content. Based on the comparison, at least one of the display rules is applied such that the layout of the content on the display device is optimized for the particular parameters of the display device.

20 Claims, 4 Drawing Sheets

DYNAMIC OPTIMIZATION OF AVAILABLE DISPLAY SPACE

BACKGROUND

Computing technology has revolutionized the way people work and play and has contributed enormously to the advancement of humankind. Computers now aid in enumerable applications such as word processing, computer simulations, advanced gaming, voice recognition, and much more. Computing systems now come in a wide-variety of forms including, for example, desktop computers, laptop computers, Personal Digital Assistants (PDAs), mobile telephones and other devices.

One area of computing technology that has become increasingly popular is the use of computers in creating documents, graphics, and other types of content for distribution on a large scale, especially over a network such as the Internet. Creating content for large scale distribution over the Internet, however, may be a frustrating endeavor for an author. In addition to composing the content, the author should format the content in accordance with the display capabilities of the various devices that the content will be presented on. The display capabilities may include the resolution of a display device, the horizontal display width, or the available area of a display window. There are also other display capabilities such as implemented computing hardware, processing capabilities, and graphics capabilities (e.g., video display capabilities, 3D object display ability, etc.) that the author must also take into account.

If the content is intended for presentation on a single display device or type of display device such as a particular computer screen, then the formatting is fairly straight forward. The display capabilities of the display device are determined and the content can be formatted in such a way that optimizes the display space.

With large scale distribution over the Internet, however, the content may be intended for a variety of display devices each having different display capabilities. In such a case, a single content format may not be optimum for all intended display devices. For example, a content format optimized for a large, high resolution display device such as a computer screen may be different from a content format optimized for a PDA. In fact, content formatted for the large display, high resolution device may not even be displayable on smaller display, low resolution devices, such as the PDA.

To accommodate for the largest number of display devices possible, it has become common for content to be formatted to utilize only the most basic display capabilities that are common to most display devices. In this way, the author of the content has at least some control over formatting regardless of the display device used to present the content. The resulting format, however, generally does not optimize the content for the available display space and/or other display capabilities. For example, since the display window width and/or screen display space are usually unknown, the content is typically formatted to align to the left side (or right side as the case may be, e.g., for languages such as Hebrew) of the display window or screen. The left/right alignment ensures that the content is left/right justified regardless of display device; however, this often results in wasted blank display space on the right/left side of the display window. In addition, the content is often not centered in the display space, creating the need for horizontal and/or vertical scrolling to view the entire content. Accordingly, formatting for the lowest common display capabilities supports the largest number of display devices, but it does not guarantee that the content is optimized for the available display space.

Due to the limitations in optimizing display areas described above, several solutions have been developed to try to optimize content layout for all display devices. One such solution uses content pagination. Content pagination takes content (e.g., a novel, magazine article, etc.) and formats it such that the content is presented on the full area of the display window or screen without any need for scrolling. Once a portion of the content is formatted into a full screen page, the remaining content is typically formatted into additional full pages as needed, where the number of pages depends on the capabilities of the display device. For example, on a PDA full width pagination may format static content into 1,400 pages while on a computer screen the full pagination is viewed as 300 pages.

The pagination solution, however, requires special formatting software that must be present on the computer hosting the display device. Consequently, content pagination is not available for display devices that do not have access to the formatting software. In addition, such pagination techniques typically do not consider all of the display capabilities of the various devices and dynamically render such content based on such limitations. Accordingly, content presented on these display devices will usually not be optimized for the display space.

Another solution currently used to optimize display space on multiple devices has been to include a single display rule that defines a desired centering point and fixed width for the content. As the display space changes (e.g., changes in resolution, size, etc.), the centering point and the width remain constant. Nevertheless, in order to give the appearance that the display layout is optimized, excess display space, if any, beyond the fixed width is simply blackened out. Note, however, that for smaller display device such as a PDA, this technique may still require scrolling since the fixed width may exceed the available display space. The content is thus not truly optimized for the full width of the display space in every circumstance.

A further display optimization solution has been to include a single one time rule (e.g., a style sheet) that optimizes content layout for the current display. For example, upon determining a client's display capabilities, a server can select a rule or style sheet corresponding to the display parameters and content type. The client then uses the rule or style sheet to format the content for optimal display layout. Although this solution offers full display of content for a larger number of display devices, changes to the display window size, different orientation or modes of the window, and/or dynamic data are not supported. For example, if the display window is resized for any reason, or if the orientation of the window is changed (e.g., from landscape to portrait, or vise versa), then the content will no longer be formatted for full display width and/or height. Although a solution to this may be to provide a plurality of rules based on various window sizes and modes, such rules would still be based on the original content type and layout.

As with the other solutions described above, these rules do not consider all of the display capabilities of the various devises and dynamically render such content based on such limitations. For example, the above solutions do not necessarily account for or consider if a display device is capable of rendering 3D images, video capabilities, processing capabilities, etc., and adjusting the rendering of the content based on such limitations. Such rules and/or rules previously discussed would not be based upon and would not specify what content may be displayed nor take content properties into account. As such, any dynamic changes to the content will not be accounted for; and therefore this solution does not provide full screen optimization for content on every display possibility.

BRIEF SUMMARY

The above-identified deficiencies of current content rendering or formatting optimization methods are overcome through example embodiments disclosed herein. Note that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example embodiment provides for systems, methods, and computer program products for optimizing content rendered at a display unit by dynamically formatting the content layout based on the display unit's parameters. In this embodiment, content is received from a server. The content is capable of being rendered at a number of remote display devices with various display parameters. In addition, at least one of a number of display rules is also received. The display rules specify how content should be rendered in terms of content layout and properties by the remote display devices based on the parameters of the display devices. The display rules are compared with the parameters of a display device that is used to render the content. Based on the comparison, at least one of the display rules is applied such that the layout of the content on the display device is optimized for the particular parameters of the display device.

Another example embodiment also provides for optimizing content rendered at a display unit by dynamically formatting the content layout based on the display unit's parameters. In this embodiment, a request for content is received from a client. The content is capable of being rendered at a remote display device with various display parameters. The display parameters of the device that is used for rendering the content are also received. The display parameters are then compared with a number of display rules which specify how content should be rendered on the display device. Based on the comparison, the content is formatted in accordance with at least one of the display rules that correspond to the display parameters. The formatted content is then provided to the client for presentation on the display device such that the layout of the content on the display device is optimized for the display parameters.

Additional features and advantages of the embodiments disclosed herein will be set forth in the description which follows, and in part will be obvious from the description, or may be learned by the practice of the invention. The features and advantages of the embodiments disclosed herein may be realized and obtained by means of the instruments and combinations particularly pointed out in the appended claims. These and other features of the embodiments disclosed herein will become more fully apparent from the following description and appended claims, or may be learned by the practice of the embodiments disclosed herein as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
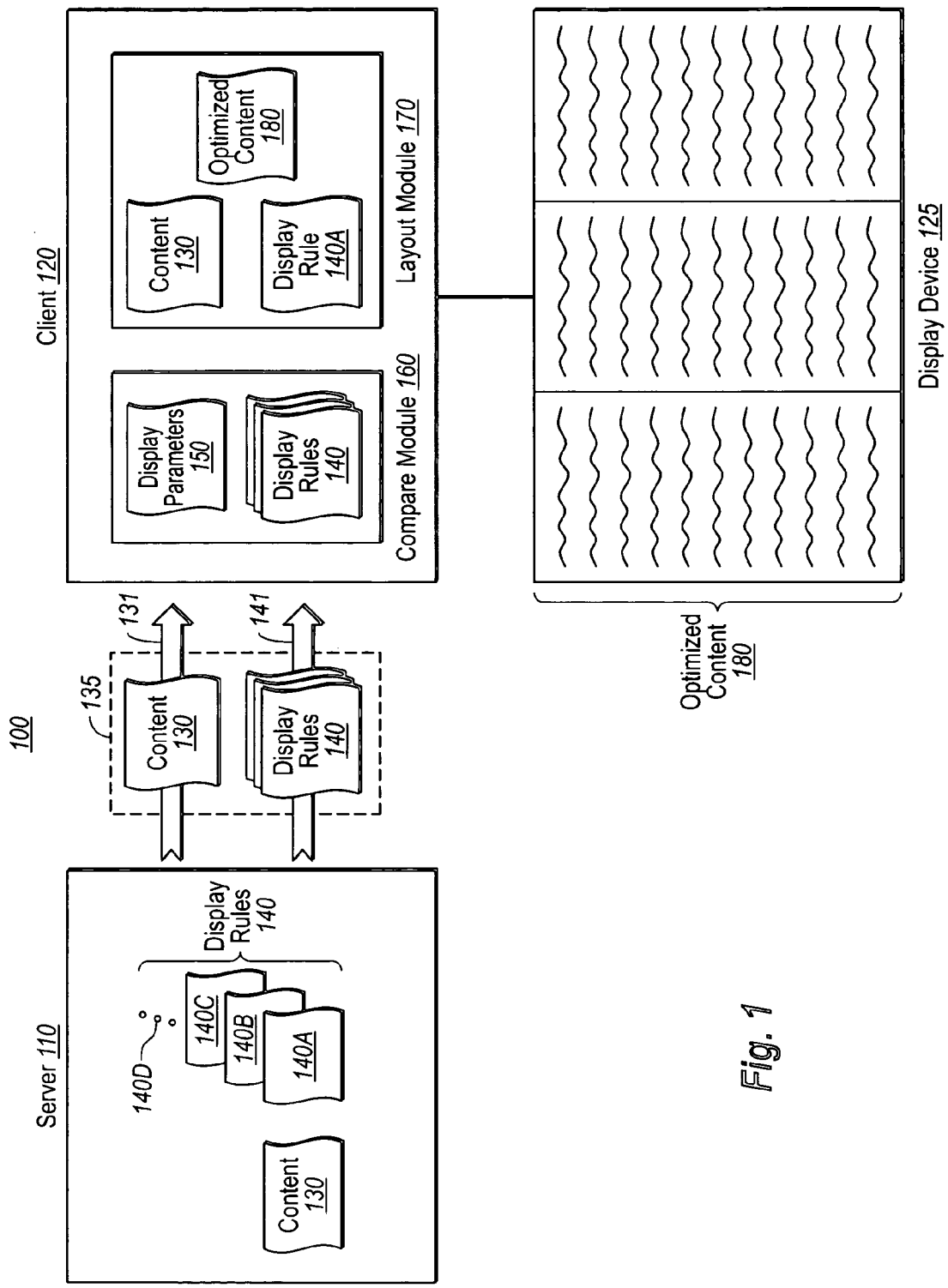
FIG. 1 illustrates a computing system configured to assist a client computer to optimize the layout of content on a display device in accordance with example embodiments.

The embodiments described herein extend to methods, systems, and computer program products for dynamically optimizing the display of content on a display device. The embodiments described herein may comprise a special purpose or general-purpose computer including various computer hardware or modules, as discussed in greater detail below.

Example embodiments provide for several mechanisms that are configured to overcome various deficiencies of current content display optimization methods, systems, and computer program products. For example, one embodiment herein provides mechanisms for a remote client with a display unit to optimize the content layout rendered on the display unit. In this embodiment, content may include text, graphics, video, images, any other display objects, or any combination thereof. In addition, the content may be received from one source or from a number of different sources. For example, text may be received from one server while a 3D image is received from a different server.

Further the content is capable of being dynamically rendered at numerous display units with various display parameters. Note that display parameters may include such things as horizontal display width, vertical display length, the display resolution of the display device, font type, font size, available colors and script type. The display parameters may also include the display device's computing hardware, processing capabilities, graphical display capabilities, or any other hardware capability that may have an effect on how a display device renders content. Of course, there may be other capabilities that may be taken into account for dynamically rendering content in accordance with embodiments described herein. Accordingly, the above list of display parameters is for illustrative purposes only and is not meant to limit or otherwise narrow the scope of embodiments described herein unless otherwise explicitly claimed.

In addition to receiving content in this embodiment, a number of display rules that correspond to the display parameters of a given display device are also received or otherwise accessed that specify how the content should be dynamically rendered or otherwise laid out on the display unit in terms of content layout and properties. For example, the rules may specify what types objects may be rendered by the display device and thus dynamically laid out and how the resulting layout will look based on properties of the content. For example, if a display device does not have the hardware capabilities to render a 3D object, the rules may limit the display to 2D objects, delete the object, or otherwise modify the object for dynamically rendering the content based on such limitations or other capabilities. In like manner, the rules may specify that all content having red text properties be dynamically rendered and displayed as black text if red text is not supported by the display device. Thus, the display rules may dynamically modify the content properties such that the content may be rendered.

In addition to specifying what content may be laid out, the rules may specify how the content is to be optimally and dynamically laid out given the display parameters and the type of content. For instance, the rules may specify that any text is to be placed in the right hand corner of a display window, that a graphic object is to be placed in the center of the display, and that some other object is to be placed on the bottom of the display window. If the content or display parameters change, the rules may specify on-the-fly a different placement of the objects so as to optimize the display capabilities of the display device. For example, the text may now be placed in the left corner, the graphics object in the bottom and a link to a video feed in the center. Accordingly, use of the rules ensures that regardless of what content is received or what changes may be made to the display parameters, the content will still be dynamically laid out in an optimum manner for the given display parameters of the display device.

As will be appreciated, there are many various results that the rules may specify for how and what type of content to dynamically render based on the display parameters. Accordingly, any specific reference to how and what type of content is dynamically rendered as described herein are used for illustrative purposes only and are not meant to limit or otherwise narrow the scope of embodiments described herein.

As mentioned, the display rules correspond to different parameters of various display units. For example, there may be a different display rule for each possible display resolution, font type, font size, available colors, layout, computing hardware capabilities, etc. Of course, one rule may encompass any number or combination of different or varying parameters. In addition, one would recognize that there are many numerous display parameters that can be considered in optimizing the layout as described herein. Accordingly, any specific reference to a particular rule and or particular parameter is used herein for illustrative purposes only and is not meant to narrow or otherwise limit the scope of embodiments described herein.

Note that in some embodiments, the content and the display rules are received as a single integrated file (e.g., an eXtensible Application Markup Language (XAML) file). In other embodiments, however, the content and the display rules may be received separately. In fact, the content and display rules may be received from separate servers or the rules may be separately stored on the display computing device. Accordingly, the embodiments herein contemplate receiving or accessing both the content and the display rules in any number of various ways. As such, any specific use of how the content, layout and display rules are received or otherwise accessed are for illustrative purposes only and are not meant to limit or otherwise narrow the embodiments described herein unless explicitly claimed.

Regardless of how the display rules are received or accessed, they may be compared with the display parameters of the display device such as, for example, but not limited to, horizontal display width, vertical display length, display resolution, display window size, font size, script type, processing abilities, graphics display capabilities, implemented hardware, etc. Based on this comparison, at least one of the display rules is applied to optimize the content layout on the display unit. Accordingly, the optimization ensures that the content is dynamically rendered and optimally displayed regardless of what type of content is received.

Other embodiments allow for a server to optimize the content presented on the display unit of a remote client. For example, the server may receive a request for content from the client. As previously noted, the content may include text, graphics, video, images, any other display objects, or any combination thereof. In some embodiments, the server queries the client about its display parameters, which are then received by the server. In other embodiments, the display parameters are provided to the server at the time of the request for content. Note that the display parameters may include horizontal display width, vertical display length, display resolution, display window size, current font size, script type, display unit hardware capabilities, graphics capabilities, or any number of other well known display parameters as described above.

These parameters are then compared with display rules that specify how the content should be dynamically formatted or otherwise laid out in terms of content layout and properties for display on the display unit of the client. Based on this comparison, at least one of the display rules is applied to format the content. The formatted content is then provided to the client for presentation on display device. Accordingly, the content is optimized such that the content utilizes at least the entire horizontal width of the display space regardless of the changes to the content.

Although more specific reference to advantageous features are described in greater detail below with regards to the Figures, embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The embodiments described herein may also be described in terms of methods comprising functional steps and/or non-functional acts. Some of the following sections provide descriptions of steps and/or acts that may be performed in practicing the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts in the recitation of the claims—and in the following description of the flow diagram(s) for FIG.(s) 2 and 4—is used to indicate the desired specific use of such terms.

FIG. 1 illustrates a computing system 100 for optimizing content rendered at a display device in accordance with one example embodiment. Computing system 100 depicts various modules and components that can be used when implementing the embodiment. Note that computing system 100 is illustrated by way of example only and should not be used to limit the scope of the appended claims. In other words, there are numerous other computing systems and component configurations that may be used to implement embodiments described herein.

Computing system 100 includes a server 110, which may be any suitable server computer. Server 110 is connected to a remote client computer 120 over a network such as the Internet, another wide area network (WAN) and/or even a local area network (LAN). In addition, server 110 and client 120 may communicate using data broadcast, wireless communications, infrared, or any other communication method. Further, client 120 may be any suitable client computer and may be configured to receive content and other data over the network from server 110. Client 120 includes a display device 125, which may be any suitable display device capable of displaying content received by client 120 such as text, graphics, video, images, any other display objects, or any combination thereof or any other type of displayable content.

Client 120 may also include display parameters 150, which describe the display capabilities of the display device. For example, the display parameters 150 may include the horizontal display width, vertical display length, and/or the display resolution of the display device 125. The display parameters 150 may also include the size of an available display window or the entire set of possible display window sizes for embodiments where the display window may be resized. The display parameters 150 may also include other well known display capabilities of the display device 125 such as preferred font size, script type, and any other number of parameters. In addition, the display parameters may further include processing capabilities, graphical display capabilities, and any other hardware capability that may effect how the display device 125 displays the content. Accordingly, as previously mentioned, the list of display parameters as described herein are for illustrative purposes only and are not meant to limit or otherwise narrow the scope of embodiments herein disclosed unless explicitly claimed.

In any event, server 110 may be configured to include content 130 that may be presented for display on display device 125. As previously mentioned, content 130 may include text, graphics, video, images, any other display objects, or any combination thereof. Server 110 may also include display rules 140. Display rules 140 include individual display rules 140A, 140B, 140C, and potentially any number of additional display rules as indicated by ellipses 140D. Display rules 140 include data configured to various display parameters of any number of display devices. For example, display rule 140A may be configured to the display parameters 150 of display device 125 while display rules 140B, 140C, and potentially 140D are configured to the display parameters of other suitable display devices. In some embodiments, more than one display rule 140 may be configured for a single display device. For example, display rules 140A and 140B may be configured to the display parameters 150 of display device 125.

Display rules 140 are utilized by client 120 to ensure that the layout of content 130 is optimized within the available display space of a display device such that at least no horizontal scrolling is necessary and that the full horizontal display width is utilized regardless of the type of content (e.g., font size, script type, etc.) and/or the display capabilities of the display device.

More particularly, the display rules 140 specify how content should be rendered in terms of content layout and properties as previously described given the specific display parameters of various display devices. For example, the display rules 140 may specify how content 130 should be rendered on display device 125 given display parameters 150. For instance, display rule 140A may specify, given a display parameter 150 such as horizontal display width, that if a line of text is greater than 20 characters, but less than 60, then one column should be used for the laying out of content 130. Alternatively, if the line of text is greater than 60 characters but less than 75 then two columns may be used for the layout of content 130. As previously mentioned, the display rules 140A, 140B, 140C, and 140D may include a collection of rules that specify how content 130 should be optimally laid out. For example, display rule 140A may indicate the number of columns of text as described, while still indicating how text may be laid out in other forms such as justification, line spacing, pagination, how graphics should be laid out, and other types of instructions. Note, however, that the rules should define at least how to optimize the horizontal layout such that no horizontal scrolling is necessary to view the content and there is minimal white space or blank space shown in the full window screen—regardless of the size of the window.

As mentioned previously, server 110 includes content 130 that may be presented for display on display device 125. Server 110 provides the content 130 to client 120 over a network as previously discussed—as illustrated by arrow 131. Since server 110 may not know the exact display parameters 150 of display device 125, server 110 also may provide a plurality of display rules 140 to client 120, as illustrated by arrow 141. Typically, the server 110 sends the plurality of display rules 140 to the client 120. In some embodiments, this plurality may include the entire set of display rules 140. In other embodiments, the server 110 may query the client 120 to ascertain some of the specific display parameters of display device 120. The server 110 may then provide a range of the plurality of display rules 140 that may correspond to specific display parameters 150.

In some embodiments the content 130 may be distributed among several different servers (sources) before being provided to client 120. For example, text may be received from one server while graphics are received from another server. The display rules would then specify how the various content from the multiple sources was to be dynamically rendered as previously described. In such embodiments, the plurality of display rules 140 may be provided by one server or they may likewise be distributed among several different servers. Note that although the above describes collecting content from servers, other sources of content are also available to embodiments herein described. For example, content may broadcast from various transmission devices, the client may be configured to access various sources for content, etc. Accordingly, content may be collected from any reasonable data source in any reasonable manner. Thus embodiments disclosed herein contemplate receiving content from any number of sources and then dynamically rendering the content on a single display.

In some embodiments, the collection of content may be based on the display parameters of a particular display device. For example, if video, 3D, or other advanced graphical content is not supported by the hardware capabilities of display device, then this type of content may not be collected. On the other hand, the display device may be configured by the display rules to collect content that it may render from various sources. For example, if the display device supported advanced graphical content, then those types of content could be collected for dynamic rendering.

In still other embodiments, one or more of the plurality of display rules 140 may already be stored on client 120. In this case, server 110 may provide an access key or other code that directs client 120 to access the plurality of display rules 140 and choose those that correspond to its specific display parameters 150. In further embodiments, the content 130 and the display rules 140 may be provided by separate servers. As previously mentioned, the embodiments herein contemplate receiving or accessing both the content 130 and the display rules 140 in any number of various ways. As such, any specific use of how the content 130 and display rules 140 are received or otherwise accessed are for illustrative purposes only and are not meant to limit or otherwise narrow the embodiments described herein unless explicitly claimed.

As previously mentioned, in some embodiments the content 130 and the display rules 140 are provided to client 120 as separate files. In alternative embodiments, however, content 130 and display rules 140 may be integrated and sent as a single file 135—as is illustrated by the dashed line in FIG. 1. For example, integrated file 135 may be an eXtensible Application Markup Language (XAML) file. Integrated file 135 may also be configured in other reasonable computing languages. Content 130 and display rules 140, whether as an integrated file or separately, are received by remote client 120 and used in the rendering process.

To facilitate the optimal rendering of content 130 on display device 125, client 120 may include a compare module 160 configured for comparing two or more groups of data. It may be implemented in software, computer hardware, or any combination of the two. Compare module 160 or other component may be configured to access the display parameters 150 for display device 125. In addition, compare module 160 or other component may access the received plurality of display rules 140. Upon accessing the display parameters 150 and plurality of display rules 140, compare module 160 may then ascertain the display rule(s) that corresponds to display parameters 150. The display rule(s) that corresponds to display parameters 150 may then be passed to layout module 170 for use in the rendering process.

Layout module 170 which is configured to optimally render content for presentation on display device 125 may be implemented in software, computer hardware, or any combination of the two. Further, layout module 170 in addition to being provided with the display rule(s) that correspond to display parameters 150 is also provided with the content 130. For example, as illustrated in FIG. 1, layout module 170 may be provided with display rule 140A. Note that although layout module 170 is shown as only being provided display rule 140A, any number of additional display rules may also be provided as necessary.

Layout module 170 may then apply display rule 140A to content 130. The application of the display rule 140A causes layout module 170 to dynamically render content 130 such that the layout of the content is optimized for the display parameters 150. For example, the applied display rule 140A specifies how content 130 will be rendered in terms of content layout and properties. For example, suppose content 130 included a block of text, a video, and a 3D object, either from one source or multiple sources. Further suppose that display device 125 did not support video. The display rule 140A would direct layout module 170 or some other component of client 120 to modify the properties of the video such that the content could be rendered. For instance, the video may be modified to become a single graphical image that may be rendered. Note that is some embodiments, layout module 170 may simply not render the video rather than modify its properties.

Display rule 140A may also specify how layout module 170 dynamically lays out the content for optimal effect. For instance, for the given parameters 150, the display may be optimally laid out by placing the video in the top of the display, the 3D object in the middle of the display, and the text at the bottom. Alternatively, the layout module may place the display objects in other locations for instances when the video, for example as described above, is not supported by the display device 125.

The application of display rule 140A to content that is in the form of text is illustrated as optimized content 180. Note that optimized content 180 is illustrated as being full horizontal width columns of text. It is also possible for optimized content 180 to be paginated such that there is no need for horizontal or vertical scrolling.

Regardless of the display parameters or the type of content, use of the display rules 140 ensures that optimized content 180 will be displayed at least using the full horizontal width of the available display window such that there is no need for horizontal scrolling. Further, the rule(s) should define how to optimize the horizontal layout such that there is minimal white space or blank space shown in the full window screen regardless of the size of the window. Accordingly, there should be no wasted space on the left and/or right sides of the display window and at least no horizontal scrolling is necessary.

If at a later time the size of the display window or the content 130 changes, the process just described can be repeated on-the-fly to ensure that the content 130 is still optimally displayed. For example, some display windows may be resized for whatever reason or the content may dynamically change. In one embodiment, the layout module 170 may reapply the display rule 140A, which was used previously to render the content 130 to optimally fit the new display window as described above. Note that the same display rule (in this case 140A) may still apply even though the display parameters 150 have changed.

For instance, suppose the display was optimized such that text was displayed in three columns that filled the entire horizontal width of a display window. Further suppose that the display window was resized to a smaller size. Since display rule 140A may correspond to the entire set of possible display window sizes for display device 125, the rule would cause layout module 170 to layout the content 130 to optimally fit the smaller display window size. In this case, the text may now only be displayed in one column that fills the entire horizontal width of the display device with vertical scrolling so that a user may read the entire text. The content is still optimized such that there is at least no need for horizontal scrolling and there is minimal white space or blank space shown in the full window screen—regardless of the size of the window.

In other embodiments, the changed circumstances of the display window (i.e., change in display parameters 150) may cause the need to apply a new display rule(s), for example display rule 140B. In embodiments where the entire set or a portion of display rules 140 was received by client 120, either from server 110 or some other server, compare module 160 may access and determine the new display rule(s) that corresponds to the new display parameters 150 and provide that to the layout module 170 as previously described. The layout module 170 will then apply the new display rule(s) 140B when rendering the content 130 such that the layout of the content is optimized (i.e., at least no need for horizontal scrolling and there is minimal white space or blank space shown in the full window screen—regardless of the size of the window) for the display device 125.

In embodiments where a plurality of display rules 140 or the appropriate portion thereof is not already received, client 120 may either request the remainder of the display rules 140 or otherwise provide the new display parameters 150 to server 110 or some other server. The server 110, or other server as the case may be, may then provide the remainder or otherwise determined plurality of display rule(s) 140 that corresponds to the new display parameters 150. As before, the display rules(s) 140 may be applied by layout module 170 when rendering the content 130 such that the layout of the content is optimized as previously described.

Figure 2:
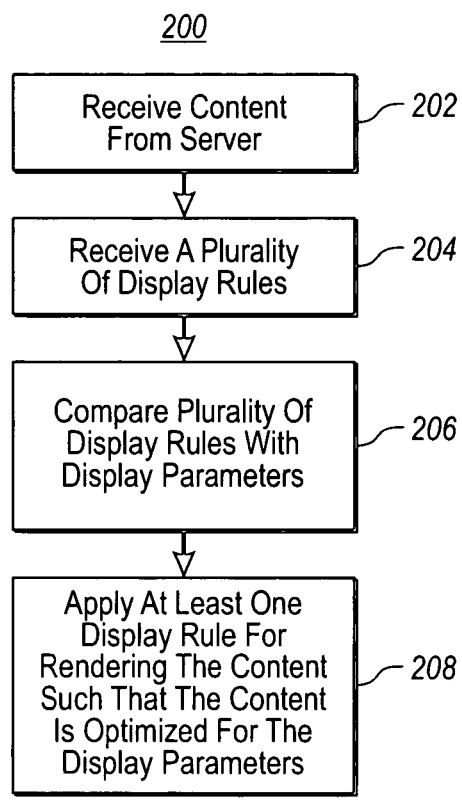
FIG. 2 illustrates a flowchart of a method for a client computer to optimize the presentation of content on a display device in accordance with example embodiments.

Turning now to FIG. 2, a flowchart of a method 200 for a client computer to optimize the presentation of content on a display device is illustrated. Method 200 will be described with frequent reference to the computing system discussed in relation to FIG. 1. It should be noted, however, that the computing system 100 is only one of numerous computing systems that can be configured to perform method 200 and should not be used to limit the scope of the appended claims.

Method 200 includes an act of receiving 202 content from a server. For example, a client, such as client 120, may receive content, e.g., content 130, from a server such as server 110 or some other server. The content is capable of being rendered at any number of remote display devices 125 with various display parameters. The content may include text, graphics, video, images, any other display objects, or any combination thereof.

Method 200 further includes an act of receiving 204 at least one of a plurality of display rules. For example, a client such as client 120, may receive display rules, e.g., display rules 140, from a server such as server 110 or some other server. The display rules specify how content should be rendered in terms of content layout and properties on a plurality of display devices with different display parameters. For instance, server 110 or some other server, not knowing the exact display parameters of display device 125, may send the entire set or a portion of display rules 140 that correspond to each individual display device of the plurality of display devices and their corresponding display parameters. Alternatively, server 110 or some other server may query client 120 for specific display parameters and may then provide display rule(s) based on the specific display parameters.

In some embodiments, the content 130 and the display rules 140 are received as separate files, either from the same server 110 or from different servers. In other embodiments, the content 130 and the display rules 140 are received as a single integrated file 135. For example, the content 130 and the display rules 140 may be a single integrated XAML file 135.

Once the content 130 and display rules 140 are received or otherwise accessed, method 200 also includes an act of comparing 206 at least one of the plurality of display rules with the display parameters of the actual display device. For example, a received plurality of display rules 140 may be accessed and compared with the display parameters 150 of the display device 125. The display parameters 150 may include, but are not limited to, horizontal display width, vertical display length, display resolution, display window size, font size, script type, processing abilities, graphics display capabilities, implemented hardware, etc. Regardless of the type of display parameters 150 used, the display rule(s) 140 that corresponds to the display device 125 display parameters 150 is then ascertained. For instance, compare module 160 may compare display parameters 150 with display rules 140 to ascertain the appropriate display rule(s).

Based on the comparison, method 200 further includes an act of applying 208 at least one of the plurality of display rules for rendering the content such that the layout of the content on the display device is optimized for the particular display parameters. For example, the display rule(s), e.g., display rule 140A, corresponding to the display parameters 150 may be applied when rendering the content 130 for display on the display device 125. Since the display rule 140A and any other necessary display rules 140 correspond to the display parameters 150, the layout of content 130 should be optimized when presented on display device 125.

For example, the rules may specify what types objects may be rendered by the display device and thus dynamically laid out and how the resulting layout will look based on properties of the content. For example, if a display device does not have the hardware capabilities to render a 3D object, the rules may limit the display to 2D objects, delete the object, or otherwise modify the object for dynamically rendering the content based on such limitations or other capabilities. In like manner, the rules may specify that all content having red text properties be dynamically rendered and displayed as black text if red text is not supported by the display device. Thus, the display rules may dynamically modify the content properties such that the content may be rendered.

In addition to specifying what content may be laid out, the rules may specify how the content is to be optimally and dynamically laid out given the display parameters and the type of content. For instance, the rules may specify that any text is to be placed in the right hand corner of a display window, that a graphic object is to be placed in the center of the display, and that some other object is to be placed on the bottom of the display window. If the content or display parameters change, the rules may specify on-the-fly a different placement of the objects so as to optimize the display capabilities of the display device. For example, the text may now be placed in the left corner, the graphics object in the bottom and a link to a video feed in the center.

Further, the applied display rule(s) 140 will cause that the layout of the content optimally use the entire horizontal width of the available display window or screen such that there is at least no need for horizontal scrolling and there is minimal white space or blank space shown in the full window screen—regardless of the size of the window. The layout of the content may also be optimized in the form of full display window or screen pagination such that there is no need for horizontal or vertical scrolling. Further, the optimization may layout the content 130 in one or more columns that use the entire horizontal width of the available display space as previously described.

In some embodiments, an available display window may change in size or the content may dynamically change. In this case, the layout module 170 may apply the same display rule(s), e.g., display rule 140A, (i.e., the same rule as was previously applied) to render the content 130 to optimally fit the new display window such that there is still no need for horizontal scrolling. In other embodiments, however, the changed circumstances of the display window or content may cause the need to apply new display rule(s) 140, e.g., display rule 140B. In the case where the entire set of display rules 140 (or sometimes even just a portion thereof) may have been received by client 120, compare module 160 may access the appropriate new display rule(s) 140 that corresponds to the new display parameters 150 and provide them to the layout module 170 as previously described. The layout module may then apply the new display rule(s) 140 when rendering the content 130 such that the layout of the content is optimized (i.e., there is at least no need for horizontal scrolling and there is minimal white space or blank space shown in the full window screen—regardless of the size of the window) for the display device 125.

Figure 3:
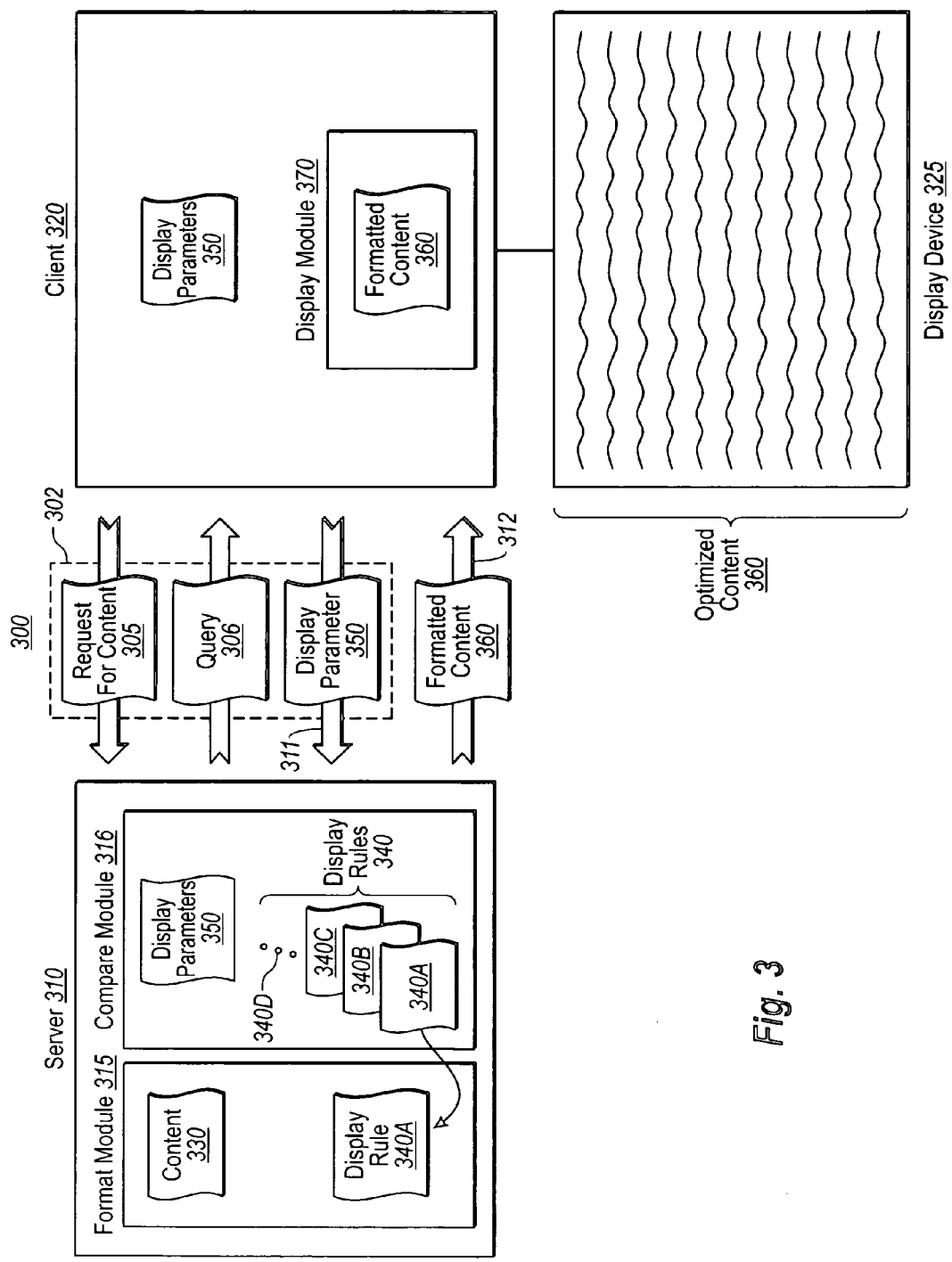
FIG. 3 illustrates a computing system configured to assist a server computer to optimize the layout of content on a display device in accordance with example embodiments.

Referring now to FIG. 3, other example embodiments described herein are also configured to allow a server 310 to optimize content 330. Accordingly, FIG. 3 illustrates a computing system 300 for allowing a server 310 to optimize content 330 rendered at a display device 325 of a client regardless of the content provided. Similar to computing system 100, computing system 300 depicts various modules and components that can be used when implementing the embodiments described herein. Nevertheless, computing system 300 is illustrated by way of example only and should not be used to limit the scope of the appended claims. In other words, there are numerous other computing systems with any number and configuration of various modules or components that may be used to implement embodiments herein.

Computing system 300 includes a server 310, which may be any suitable server computer. Similar to server 110 of FIG. 1, server 310 is connected to a remote client computer 320 over a network such as the Internet, another wide area network (WAN) and/or a local area network (LAN). In addition, server 310 and client 320 may communicate using broadcast data, wireless communication, infrared and any other communication method as described above in relation to FIG. 1. Further, client 320, which may be any suitable client computer configured to receive content and other data over the network from server 310 or other servers, includes a display device 325. Display device 325 may be any suitable display device capable of displaying content received by client 320 such as may include text, graphics, video, images, any other display objects, or any combination thereof or any other type of displayable content.

Client 320 may also include display parameters 350, which describe the display capabilities of the display device 325. For example, the display parameters 350 may include such things as horizontal display width, vertical display length, the display resolution of the display device, font type, font size, available colors and script type. The display parameters may also include the display device's computing hardware, processing capabilities, graphical display capabilities, or any other hardware element or process that may have an effect on how a display device renders content. Accordingly, as previously mentioned, the list of display capabilities as described herein is for illustration only and should not be used to limit the scope of the appended claims.

In any event, server 310 may be configured to include content 330 that may be presented for display on display device 325. Similar to content 130 of FIG. 1, content 330 may include text, graphics, video, images, any other display objects, or any combination thereof. Server 310 may also include a plurality of display rules 340. Display rules 340 may include individual display rules 340A, 340B, 340C, and potentially any number of additional display rules 340 as indicated by ellipses 340D. Display rules 340 include data configured to various display parameters of any number of display devices. For example, display rule 340A may be configured to the display parameters 350 of display device 325 while display rules 340B, 340C and potentially 340D are configured to the display parameters of other suitable display devices. In some embodiments more than one display rule 340 may be configured for a single display device. For example, display rules 340A and 340B may be configured to the display parameters 350 of display device 325. In other embodiments, the content 330 and the plurality of display rules 340 may be stored on different servers. For example, the content 330 may be included on server 310 while the plurality of display rules may be included on a different server.

In a similar manner as described in relation to FIG. 1, display rules 340 are utilized by server 310 to ensure that the layout of content 330 is optimized within the available display space of a display device such that at least no horizontal scrolling is necessary and that the full horizontal width is utilized regardless of the type of content (e.g., font size, script type, etc.) and/or the display capabilities of the device 325.

More specifically, the display rules 340 specify how content should be rendered given the specific display parameters 350 of various display devices 325. For example, the display rules 340 may specify how content 330 should be rendered on display device 325 given display parameters 350. For instance, display rule 340A may specify, given a display parameter 350 such as horizontal display width, that if a line of text is greater than 20 characters but less than 60, then one column should be used for lying out of the content 330. Alternatively, if the line of text is greater than 60 characters, but less than 75, then two columns may be used for the layout of content 330.

As previously mentioned, the display rules 340A, 340B, 340C, 340D, etc., may include a collection of rules that specify how content 330 should be optimally laid out. For example, display rule 340A may indicate the number of columns of text as described, while still indicating how text may be laid out in other forms such as justification, line spacing, pagination, how graphics should be laid out, and other types of instructions. Note, however, that the rules should define at least how to optimize the horizontal layout such that no horizontal scrolling is necessary to view the content. In addition, typically the optimization will ensure that there is minimal white space or blank space shown in the full window screen—regardless of the size of the window. Note, however, that this later optimization may or may not be necessary for this embodiment.

Regardless of what the rule(s) 340 define, as mentioned previously, server 310 may include content 330 that may be presented for display on display device 325. In some embodiments, server 310 may receive a request 305 for content 330 from client 320. Since the server 310 may not know the exact display parameters of display device 325, server 310 may, in response to receiving the request 305, provide a query 306 to client 320 for the display parameters 350. Server 310 may then receive display parameters 350 from client 320 in response to the query 306 as illustrated by arrow 311. In other embodiments, client 320 may include the display parameters 350 with the request for content 305—as illustrated by dashed line 302. In such embodiment, there may be no need for the server 310 to query client 320 for the display parameters 350. In other instances, however, where, e.g., only a portion of the display parameters are provided in the initial request for content 302, then an additional query 306 may be needed.

To facilitate the optimal rendering of content 330 on display device 325, server 310 may include a compare module 316 configured for comparing two or more groups of data. As with other components, the compare module 316 may be implemented in software, computer hardware, or any combination of the two. Compare module 316 or other component may be configured to access the display parameters 350 for display device 325 received from client 320 as previously described. In addition, compare module 316 or other component may access the set of display rules 340, whether stored on server 310 or another server. Compare module 316 may then compare the received display parameters 350 with the display rules 340 to ascertain the display rule(s) 340 that correspond to display parameters 350. The display rule(s) 340 that corresponds to display parameters 350 may then be used by server 310 in formatting content 330 for presentation on display device 325 as will be described in further detail to follow.

More specifically, server 310 may also include a format module 315, which is configured to optimally format content 340 for presentation on display device 325. It may be implemented in software, computer hardware, or any combination of the two. Format module 315 accesses the content 330, whether stored on server 310 or another server. It is also provided with the display rule(s) 340 that correspond to display parameters 350 as determined by compare module 316. For example, as illustrated in FIG. 3, format module 315 may be provided with a display rule 340A. Note that although format module 315 is shown as only being provided display rule 340A, any number of additional display rules may also be provided as necessary.

Once format module 315 receives the determined display rule(s), e.g., 340A, it may then apply such rule(s) to content 330 as previously described. For example, the application of the display rule(s), e.g., 340A, (and any additional display rule(s) as needed) causes format module 315 to format content 330 such that the layout of the content is optimized for the display parameters 350; thus producing formatted content 360. In some embodiments, formatted content 360 may include formatted content for a plurality of possible display window sizes or for other potential changes to display parameters 350. Alternatively, upon changes to the display parameters 350 as previously described with regards to FIG. 1, the client 320 may make a request for updated formatted content 360 in a manner as that previously described.

In any event, the formatted content 360 (whether based on initial display parameters 350 or some change thereto) is then provided to client 320 for presentation on display device 325—as illustrated by arrow 312. The formatted content 360 is received by a display module 370, which may be hardware, software, or any combination of the two. The display module 370 interrupts the formatted content 360 and renders the formatted content 360 on display device 325. Note that the formatted content 360, as previously mentioned, is optimized for the display parameters 350, thus ensuring that formatted content 360 will be displayed using at least the full horizontal width of the available display window or screen such that there is no need for horizontal scrolling. Further, the formatted content 360 is typically laid out such that there is minimal white space or blank space shown in the full window screen— regardless of the size of the window. Accordingly, there should be no wasted space on the left and/or right sides of the display window and at least no horizontal scrolling is necessary.

Note that optimized content 360 is illustrated as being displayed as text utilizing the full horizontal width of the screen or display window of display device 325. It is also possible to for optimized content 360 to be paginated such that there is no need for horizontal or vertical scrolling or to be formatted into full horizontal width columns.

As previously mentioned, the above described optimization mechanism may be dynamically applied anytime the display parameters 350 of display device 325 change. For example, if the available display 325 window size were to change, the client 320 may send the new parameters to server 310 in those manners previously described (e.g., through a query 306 or other manner). Server 310 may then format the content 360 to match the new display parameters 350 and provide the formatted content 360 to client 320 as previously described.

Figure 4:
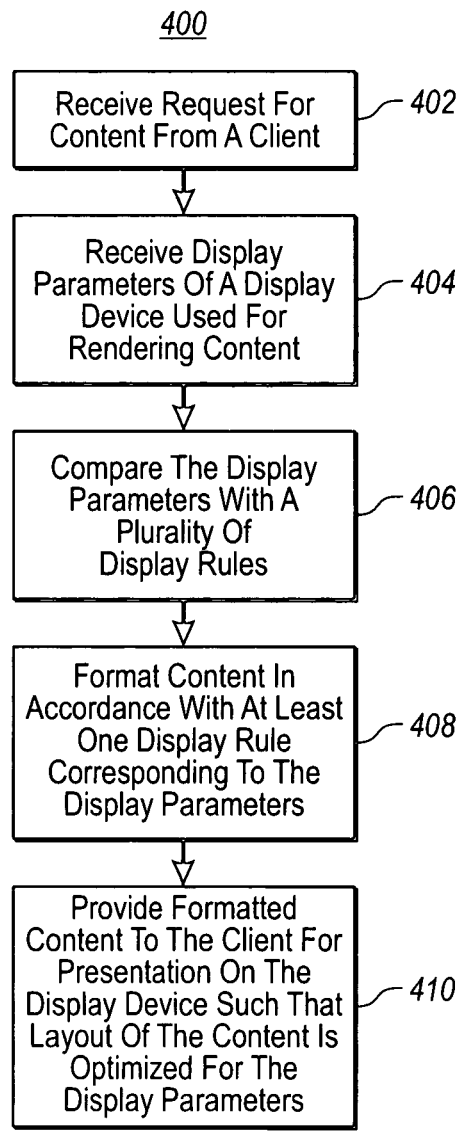
FIG. 4 illustrates a flowchart of a method for a server computer to optimize the presentation of content on a display device in accordance with example embodiments.

Turning now to FIG. 4, a flowchart of a method 400 for a server computer to optimize the presentation of content on a display device of a client is illustrated. Method 400 will be described with frequent reference to the computing system discussed in relation to FIG. 3. It should be noted, however, that the computing system 300 is only one of numerous computing systems that can be configured to perform method 400 and should not be used to limit the scope of the appended claims.

Method 400 includes an act of receiving 402 a request for content from a client. For example, server 310 may receive a request for content 330 from client 320, wherein the content is capable of being rendered at any number of remote display devices 325 with various display parameters 350. Further, the content may include text, graphics, video, images, any other display objects, or any combination thereof.

Method 400 further includes an act of receiving 404 display parameters of a display device used for rendering the content. For example, server 310 may receive display parameters 350 from a client 320, which may include, but are not limited to, such things as horizontal display width, vertical display length, the display resolution of the display device, font type, font size, available colors and script type. The display parameters may also include the display device's computing hardware, processing capabilities, graphical display capabilities, or any other hardware element that may have an effect on how a display device renders content.

In some embodiments, in response to receiving the request for content 305, the server 310 queries 306 the client 320 for the display parameters 350. The client then provides the display parameters 350 to the server 310. In other embodiments, the display parameters 350 are provided to the server 310 at the initiation of the client 320 at the time the request for content 305 is provided to the server 310. The request 305 and the parameters 350 may be sent as a single file 302 or as separate files.

Regardless of how the display parameters 350 are received by the server 310, method 400 also includes an act of comparing 406 the received display parameters with a plurality of display rules. For example, compare module 316 may be used for comparing the received display parameters 350 with the plurality of display rules 340. The display rules 340 specify how content should be formatted for display on a display device 325 corresponding to the display parameters 350. The display rule(s) (e.g., 340A) that correspond to the display device 325 display parameters 350 are then ascertained.

Based on the comparison, method 400 further includes an act of formatting 408 the content in accordance with at least one display rule corresponding to the display parameters. For example, the display rule(s), e.g., 340A, corresponding to the display parameters 350 are then applied when formatting the content 330 for display on the display device 325, thus producing formatted content 360. Note that since the display rule(s) (e.g., 340A) applied are specific to the display parameters 350, the layout of content 330 should be optimized when presented on display device 325.

Method 400 also includes an act of providing 410 the formatted content for presentation on the display device such that the layout of the content is optimized for the display parameter. For example, the formatted content 360 may be provided to client 320, wherein the display module 370 interrupts the formatted content 360 and provides a layout of the formatted content 360 to display device 325 such that the content is optimized for the display parameters 350. The use of the display rule(s) 340 for formatting the content 330 will cause that the layout of the content optimally to use at least the entire horizontal width of the available display window or screen such that there is no need for horizontal scrolling. The layout may also be in the form of full display window or screen pagination such that there is no need for horizontal or vertical scrolling or in one or more columns that use the entire horizontal width of the available display space. Further, the rule(s) 340 should define the layout in such a way that there is minimal white space or blank space shown in the full window screen—regardless of the size of the window. Accordingly, there should be no wasted space on the left and/or right sides of the display window.

In some embodiments, an available display window 325 may change in size or the content 330 may dynamically change. In this case, the display module 370 may cause the formatted content 360 to optimally fit in the new display window 325 such that there is still no need for horizontal scrolling based on the same display rule (e.g., 340A) previously applied.

In other embodiments, the changed circumstances of the display window or content may cause the need to apply a new display rule 340, for example display rule 340B. In such case, the entire process may be repeated as needed. For example, the client 320 may provide the new display parameters to server 310. The compare module 316 will ascertain the display rule 340 that corresponds to the new display parameters 350. The format module 315 will use such rule(s) to optimally format content 330, which will then provided to client 320. The display module 370 will then optimally layout the formatted content 360 for presentation on display 325.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computing system including a server and a remote client, the remote client having a display unit, a method of optimizing content rendering at the display unit of the remote client to eliminate horizontal scrolling and minimize blank space, regardless of the content provided, by dynamically formatting the content layout based on the display unit's capabilities, the method comprising:

at a client, receiving a file of original content from a server, wherein the original content as received from the server is capable of being rendered at a plurality of remote display devices, the plurality of remote display devices having various different sets of display parameters, and wherein the server provides the original content for display according to any of the various different sets of display parameters while unaware of precise capabilities of the different remote display devices;

receiving, at the client, a plurality of display rule sets from the server, each of the rule sets specifying how content should be rendered in terms of content layout and properties at the plurality of display devices based on each display devices' parameters, which display device parameters describe display device capabilities that affect a current graphical display of the content for a specific device, and wherein each of the display rule sets are specific to a particular combination of display parameters describing a particular set of capabilities of a display device, and wherein receiving the plurality of display rule sets includes receiving one or more access keys for accessing at least one display rule set already stored at the client;

comparing the plurality of display rule sets with parameters of a display device used for rendering the original content at the remote client, wherein the display device's parameters describe the display device's capabilities that affect the current graphical display of the original content;

identifying at least one display rule set from the plurality of display rule sets received from the server, based on the comparison of the plurality of display rule sets with parameters of the display device at the remote client, which is specific to a particular combination of display parameters correlating with at least some of the parameters corresponding to the display device's capabilities; and based on the comparison, applying the at least one display rule set from the plurality of display rule sets for rendering the original content at the display device, such that the layout of the original content on the display device is optimized for the particular display parameters of the display device, and based on the at least one display rule set of the plurality of rule sets being specific to a particular combination of display parameters in common with the particular display parameters of the display device at the remote client, wherein applying the at least one display rule set includes dynamically modifying the original content to produce modified content derived from the original content and having one or more modified content items that have been modified from a form in the original content, wherein modifying the original content is performed at the client such that the modified content that includes the one or more modified content items is optimized for display on the display device of the client.

2. The method of claim 1, wherein the original content and the display rules are integrated and sent as a single file.

3. The method of claim 2, wherein the single file is an Extensible Application Markup Language (XAML) file.

4. The method of claim 1, wherein the display parameters include horizontal display width.

5. The method of claim 1, wherein the display parameters include display resolution.

6. The method of claim 1, wherein the display parameters include display window size.

7. The method of claim 1, wherein the optimization ensures that the modified content is displayed in the full horizontal width of the display device window such that there is no need for horizontal scrolling.

8. The method of claim 1, wherein the optimization ensures pagination such that there is no need for horizontal or vertical scrolling in the display device window.

9. The method of claim 1, wherein the optimization ensures full horizontal width columns to optimize display space.

10. A computer program product for use in a computing system including a server and a remote client with a display unit, the computer program product for implementing a method of optimizing content rendering at the display unit regardless of the content provided by dynamically formatting the content layout based on the display unit's parameters, the computer program product comprising one or more computer-readable storage media having thereon computer-executable instructions that, when executed by one or more processors of the computing system, cause the computing system to perform the method of claim 1.

11. The computer program product of claim 10, wherein the display parameters are one of display device resolution, horizontal display width, and display window size.

12. The computer program product of claim 10, wherein the optimization ensures that the original content is displayed in the full width of the display device window such that there is no need for horizontal scrolling.

13. The computer program product of claim 10, wherein the optimization ensures pagination such that there is no need for horizontal or vertical scrolling in the display device window.

14. In a computing system including a server and a remote client with a display unit, a method of optimizing content rendering at the display unit regardless of the content provided by dynamically formatting the content layout based on the display unit's parameters, the method comprising:
    at a server, receiving a request for original content from a client, wherein the original content is capable of being rendered at any of a plurality of clients having various different sets of display parameters, including at a remote display device at the requesting client, the remote display device having a particular set of display parameters;
    providing the original content to the client for presentation on the display device such that the layout of the original content on the display device is optimized for the particular set of display parameters of the display device, wherein providing the original content includes:
      sending to the client a plurality of display rules that specify how content should be formatted for display on a plurality of display devices based on various display parameters, wherein the server sends the display rules while being unaware of the particular set of capabilities of the remote display device at the requesting client, and wherein the plurality of display rules include a combination of display parameters consistent with the particular set of capabilities of the remote display device despite the server being unaware of the particular set of capabilities of the remote display device at the requesting client, wherein sending to the client the plurality of display rules includes sending to the client one or more access keys for accessing at least one display rule already stored on the requesting device,
    wherein the sent plurality of display rules are configured to enable the requesting client to access the plurality of rules, compare the plurality of display rules with a set of display parameters of the remote display device at the requesting client, and format the original content for optimization on the remote display device at the requesting client, wherein formatting the original content for optimization includes the requesting client dynamically modifying the original content to produce modified content that includes one or more modified content items that are modified from such items provided in the original content, such that the modified content that includes the one or more modified content items is optimized for display on the remote display device of the requesting client.

15. The method of claim 14, wherein the display parameters of the remote display device at the requesting client include a preferred font size and script type.

16. The method of claim 14, wherein the content and the plurality of display rules sent to the client are included within a single, integrated eXtensible Application Markup Language (XAML) file.

17. The method of claim 14, wherein the content is formatted such that there is no need for horizontal scrolling in a display window of the display unit.

18. The method in accordance with claim 14, wherein the content is formatted to paginate such that there is no need for horizontal or vertical scrolling in a display window of the display unit.

19. The method in accordance with claim 14, wherein the content is formatted to create full horizontal display width columns to optimize display space.

20. The method in accordance with claim 14, wherein:
    providing the formatted content to the client includes determining the display parameters of the display device of the client, which display parameters are applied to the content to minimize blank space of the display, regardless of window size;
    the display parameters include each of display device resolution, horizontal display width, and display window size;
    the plurality of display rules and the at least one display rule are each specific to a particular display device;
    the plurality of display rules and the at least one display rule are set to display columns that prevent horizontal scrolling, as well as at least two of: justification, line spacing, pagination, and graphics layout; and
    formatting the content in accordance with the identified at least one display rule set corresponding to the particular combination of display parameters of the display device of the client includes changing content from an unsupported type of video to a supported type of single graphical image.

* * * * *